No. 892,648. PATENTED JULY 7, 1908.
J. A. CAIN.
FELLY JOINT.
APPLICATION FILED MAR. 18, 1908.
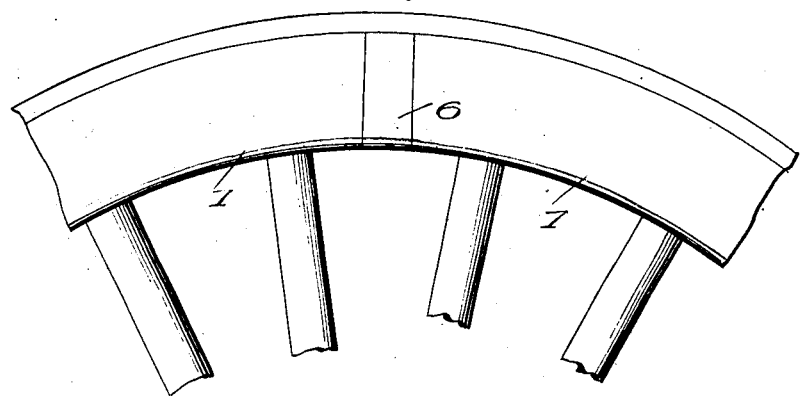
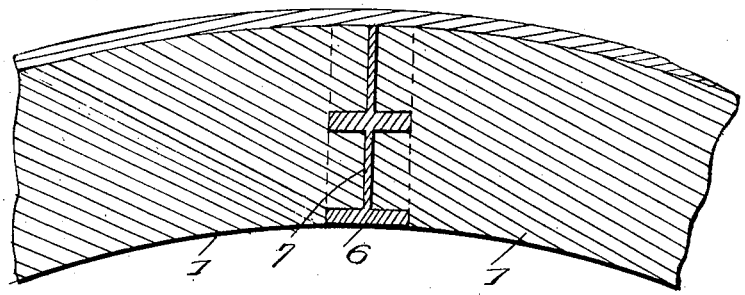
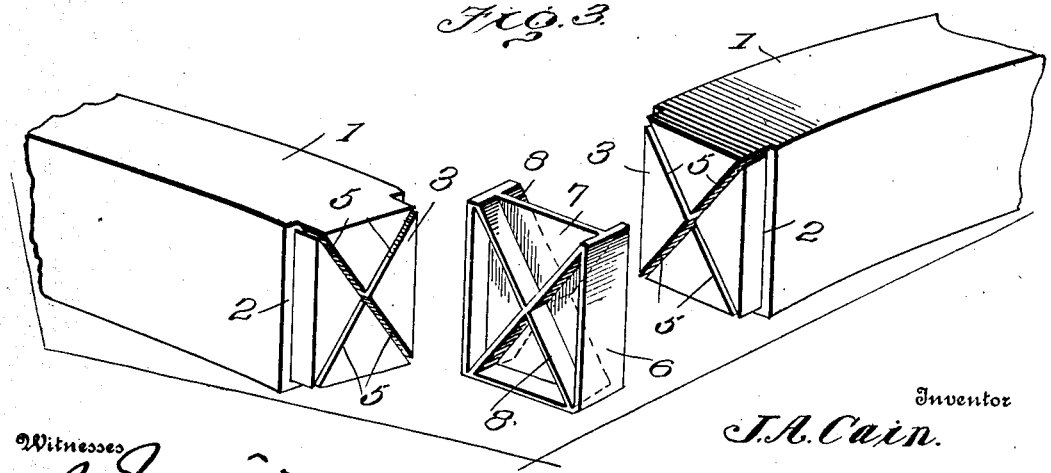
Inventor
J. A. Cain.
Witnesses
By
Attorneys

UNITED STATES PATENT OFFICE.

JOHN A. CAIN, OF WISE, MISSOURI.

FELLY-JOINT.

No. 892,648.

Specification of Letters Patent.

Patented July 7, 1908.

Application filed March 18, 1908. Serial No. 421,856.

*To all whom it may concern:*

Be it known that I, JOHN A. CAIN, citizen of the United States, residing at Wise, in the county of Barton and State of Missouri, have invented certain new and useful Improvements in Felly-Joints, of which the following is a specification.

This invention has for its object a simple, durable, and efficient construction of felly joint designed to securely hold the two abutting ends of felly sections of vehicle wheels to prevent the same from any lateral relative movement and to also prevent them from splitting, and the invention consists in certain constructions, arrangements and combinations of the parts that I shall hereinafter fully describe and claim.

For a full understanding of the invention, reference is to be had to the following description and accompanying drawings, in which:

Figure 1. is a side elevation of a portion of a vehicle wheel embodying the improvements of my invention; Fig. 2 is a longitudinal sectional view thereof; and, Fig. 3 is a detail view of the parts separated.

Corresponding and like parts are referred to in the following description and indicated in all the views of the drawings by the same reference characters.

Referring to the drawing, the numeral 1 designates two contiguous felly sections of a vehicle wheel, each of which is formed at its joint end with a marginal recess 2 extending around its inner and two adjacent sides, as shown. These recesses 2 define tenons 3 which are formed with two intersecting diagonal grooves 5 communicating with the recess 2.

6 designates a splice member which may be formed of malleable iron or any other suitable metal or material, said splice piece being designed to fit in the recesses 2 of two adjoining felly sections 1 around the tenons 3 thereof. Said splice member 6 is formed with a middle transversely extending web 7 and on each face of said web with two intersecting diagonal ribs 8 joining the web to the sides of the splice member, said ribs being adapted to fit securely within the intersecting diagonal grooves 5 of the respective tenons 3. The splice member 6 terminates at its outer end flush with the outer faces of the felly sections 1, the ordinary tire as shown being secured to the felly and extending across the outer end of the splice member with its web 7 interposed between the two sections.

From the foregoing description in connection with the accompanying drawing, it will be seen that I have provided a very simple construction of splice member and joint for the adjoining ends of the felly sections of a vehicle wheel, which will impart rigidity and strength to the wheel and thereby increase the longevity of the vehicle equipped with the invention, the said splice members being cheaply manufactured and the tenons of the adjoining sections being easily formed and the parts then readily assembled. It is to be understood that my improved splice members are supplied preferably in sets, with webs 7 of different thicknesses, so that after the wheel has been in use some time, and the tire begins to become loose, one splice member with a comparatively thin web may be removed and replaced by another with a thick web.

Having thus described the invention, what is claimed as new is:

1. In a vehicle wheel, adjoining felly sections formed in their adjacent ends with marginal recesses extending around the inner and two adjacent sides of the section, tenons defined by said recesses and each tenon being formed with two diagonal grooves communicating with the recesses, and a splice member interposed between said tenons and receiving the same and fitting around the recesses of both of the adjoining sections, said splice member being formed with a middle transverse web interposed between the two tenons and with intersecting diagonal ribs formed on the opposite faces of said webs and fitting in said grooves, the splice member terminating at its outer end flush with the outer faces of the felly sections.

2. In a vehicle wheel, felly sections formed at their adjoining ends with marginal recesses, and tenons defined thereby, said tenons being formed with intersecting diagonal grooves, and a splice member extending around the recesses of the two adjacent sections and formed with a web interposed between the said tenons and with intersecting ribs fitting in the said grooves.

In testimony whereof I affix my signature in presence of two witnesses.

JOHN A. CAIN. [L. S.]

Witnesses:
ALBERT TENER,
MILTON TENER.